United States Patent [19]

Kobayashi et al.

[11] Patent Number: 5,239,138
[45] Date of Patent: Aug. 24, 1993

[54] COORDINATE INPUT APPARATUS

[75] Inventors: Katsuyuki Kobayashi, Yokohama; Shinnosuke Taniishi; Atsushi Tanaka, both of Kawasaki; Yuichiroh Yoshimura; Kiyoshi Kaneko, both of Yokohama; Ryohzo Yanagisawa, Matsudo; Takeshi Kamono, Chohshi, all of Japan

[73] Assignee: Canon Kabushiki Kaisha, Tokyo, Japan

[21] Appl. No.: 777,924

[22] Filed: Oct. 17, 1991

[30] Foreign Application Priority Data

Oct. 19, 1990 [JP] Japan .................. 2-279303

[51] Int. Cl.⁵ ............................................. G08C 21/00
[52] U.S. Cl. ..................................... 178/18; 367/907; 340/706
[58] Field of Search .............. 178/18, 19; 364/560; 367/907; 340/706

[56] References Cited

U.S. PATENT DOCUMENTS 4,886,943 12/1989 Suzuki et al. .............. 178/18
4,931,965 6/1990 Kaneko et al. .............. 178/18 X Primary Examiner—Stafford Schreyer
Attorney, Agent, or Firm—Fitzpatrick, Cella, Harper & Scinto

[57] ABSTRACT

A coordinate input apparatus determines the coordinates of contact of a vibration pen with a vibration transmission plate by detecting vibrations from the pen through a vibration sensor. Constants required for measurement are generated in a constant determination circuit on the basis of vibration cycle measurements and a circuit measures the cycle of the detected vibrations from the vibration sensor using the determined constants. Automatic determination of constants eliminates inaccuracies due to component variations and reduces production costs and maintenance.

8 Claims, 13 Drawing Sheets

COORDINATE INPUT APPARATUS

BACKGROUND OF THE INVENTION

1. Field of the Invention

The present invention relates to a coordinate input apparatus, and more particularly, to a coordinate input apparatus which detects by means of a vibration sensor disposed on a vibration transmission plate, a vibration inputted from a vibration pen so as to determine the coordinates of the vibration pen on the vibration transmission plate.

2. Description of the Related Art

A coordinate input apparatus shown in FIG. 13, which is, for example, disclosed in U.S. Pat. No. 4,931,965, is known in the prior art. The apparatus of FIG. 13 accepts coordinates input from a vibration pen 73 in an input tablet of a transmission plate 78. The input coordinate information is output to an information processing apparatus, such as a personal computer or the like, to which the coordinate input apparatus is connected.

The vibration pen 73 is a pen for generating vibration waves in the transmission plate 78 which transmits the vibration waves. The vibration pen 73 comprises a vibrator 74, a horn 75 and a supporting body therefor. Reference numeral 72 denotes a pen driving circuit; reference numeral 76 denotes a vibration sensor for detecting vibration waves transmitted through the transmission plate 78; and reference numeral 77 denotes a reflection preventing material for preventing reflection in an end surface of the transmission plate 78.

In a case where a transmission time Tp based on a phase speed Vp is measured and a distance r is computed, the distance r from an instructed point to the vibration sensor 76 becomes the following:

$$r = n \cdot \lambda + vp \cdot Tp \qquad (30)$$

where $\lambda$ is a wavelength of the vibration waves and n is an integer. The n of equation 30 can be determined from the following equation:

$$n = int\ [(VgTg - VpTp)/\lambda + 0.5] \qquad (31)$$

where Vg is a group velocity and Tg is a transmission time corresponding to the group velocity.

Since the group velocity Vg and the phase speed Vp can be considered to be constants unique to the material used for a propagation material, Tg and Tp are measured to determine the distance. Vibration wave detection circuits 1, 2, 3 denoted as elements 83 to 85, latch circuits 1, 2, 3 denoted as elements 86 to 88, and a timing counter 79 constitute a circuit for measuring Tg and Tp.

In the above-described construction, a control apparatus 71 drives the vibration pen 73 via drive circuit 72 and makes the timing counter 79 begin counting from zero.

Vibration waves generated by the vibration pen 73 reach the vibration sensor 76 after a lapse of transmission times Tg and Tp based on the group velocity Vg and the phase speed Vp. The vibration waves are converted into electrical signals by the vibration sensor 76 and reach vibration wave detection circuits 1, 2 and 3 (elements 83 to 85) after passing through prestage amplifiers 1, 2 and 3 (elements 80 to 83). The vibration wave detection circuits detect a point on a vibration waveform based on the group velocity and the phase velocity and outputs Tg and Tp detection signals to latch circuits 1, 2 and 3 (elements 86 to 88).

The latch circuits 1, 2 and 3 (elements 86 to 88) use these Tg and Tp detection signals as triggers to read in the count value of the timing counter 79.

The control apparatus 71 computes each distance from the vibration sensor 76 to an input point of the pen on the basis of equations (30) and (31) from transmission times Tg and Tp measured in the above way and performs a geometric calculation thereof to obtain coordinate values.

At this time, as is apparent from equation (30), constants used for detecting the distance r are a wavelength $\lambda\ (= VpT)$ and the phase speed Vp. These constants are determined on the basis of the frequency $f\ (= 1/T)$ of the detected vibration waves and the phase speed Vp.

However, needless to say, the wavelength $\lambda$ and the phase speed Vp in equation (30) must be determined accurately in order to obtain highly accurate coordinates in the above-described prior art.

It is generally known that the velocity Vp of plate waves which propagate through a propagation body (the vibration transmission plate 78) depends upon the frequency of the plate waves. The vibration input pen 73 for generating plate waves obtains mechanical energy by applying a high-frequency voltage to a vibrator 74, which is composed of, for example, piezoelectric elements in an input pen, and causes a propagation body to generate plate waves through a member, such as a horn.

In contrast to a driving frequency of an applied voltage, the response frequencies of waves input to the propagation body differ from vibration input pen to vibration input pen due to variations in the mechanical characteristics (e.g., resonance characteristics) of piezoelectric elements or to variations in the mechanical characteristics of a member, such as a horn.

Therefore, it is necessary to know the characteristics of individual input pens to realize a coordinate input apparatus with a high degree of accuracy.

Also, since constants Vp and $\lambda$ depend upon the frequency of plate waves, they also depend upon the frequency of the pulses by means of which the piezoelectric elements are driven. Therefore, in mass production, to eliminate variations in the driving frequency, the variations of individual circuits must be eliminated and circuits having no variations of those of electronic parts must be used. From this viewpoint, the conventional construction has a problem in that an increase in cost is required to achieve higher accuracy.

Even if low-cost circuits having a high degree of accuracy are used, the driving frequency must be measured for each circuit. Inspection increases the cost in the same manner as input pen variations, and thus the circuits are not suited for mass production.

In actual use, a horn member, which is a pen tip of the input pen, is worn down over time due to the contact and sliding with the input surface (i.e., the transmission plate).

Therefore, the mechanical characteristics of the horn member change with the amount of wear. As a result, a frequency outputted by the pen tip changes with the amount of wear. There is a problem in that the set constants f, Vp and Vg change and accuracy decreases.

In the above-described prior art, the response in the pen tip with respect to a frequency at which piezoelectric elements are driven is not a single frequency spectrum, but contains various frequency components.

Therefore, signal waveforms which are transmitted on the transmission plate and output from the sensor contain the various frequency components. Therefore, the cycle of the phase of the detected signal waveforms is not fixed. A detection point at a phase delay time tp based on the phase speed Vp changes according to the difference in levels of the detected signal waveforms caused by the changes in the input state of the pen.

That is, in FIG. 10, it is assumed that a detection point of Tp in a certain state is at a point corresponding to a delay time Tp2. At this time, a calculated distance 10 becomes the following from equation (30):

$$l0 = n0\lambda + VpTp2$$

n0 becomes the following from equation (31):

$$n0 = int\,[(VgTg0 - VpTp2)/\lambda + 0.5]$$

Assuming that, with the distance of the input pen being unchanged, for example, the writing pressure of the input pen changes and the level of the detected waveform changes, causing a Tp detection point to change to a point corresponding to a delay time Tp3, and a distance 10' calculated at this time becomes the following from equation (31):

$$\begin{aligned} n' &= int[(VgTg0 - VpTp3)/\lambda + 0.5] \\ &= int[(VgTg0 - VpTp2)/\lambda - (VpT2)/\lambda + 0.5] \\ &= n0 - 1 \; (\because \lambda \approx VpT2) \end{aligned}$$

From equation (30), $$\begin{aligned} l0' &= n'\lambda + VpT3 \\ &= (n0 - 1)\lambda + Vp(Tp2 + T2) \\ &= n0\lambda + VpTp2 + VpT2 - \lambda \\ &= l0 + (VpT2 - \lambda) \end{aligned}$$

Here, due to the above-described problems, T1, T2, T3, T4 . . . Tn are not fixed. Accordingly, there is a problem in that, even if the same point is inputted, calculated results will differ due to a variation (for instance, the relation VpT2=λ does not hold) in Tn when the Tp detection point deviates.

SUMMARY OF THE INVENTION

Accordingly, an object of the present invention is to provide a coordinate input apparatus which is capable of determining an accurate cycle of vibrations and constants necessary for computing coordinates, which constants are determined from this cycle at all times, by measuring the cycle of the phase of detected signals, thereby considerably improving the accuracy of computing coordinates.

Another object of the present invention is to provide a coordinate input apparatus for which processes for inspecting the apparatus itself during production are simplified and therefore production costs can be reduced, and whose maintenance is easy.

The invention is directed to coordinate input apparatus in which vibrations are inputted to a vibration transmission member by a vibration input pen. A vibration sensor detects the vibrations transmitted through the transmission member and a measurement circuit determines the cycle of detected vibrations. A control circuit calculates the vibration pen contact coordinates according to predetermined constants.

The aforementioned and other objects, features and advantages of the present invention will become clear when reference is made to the following description of the preferred embodiments of the present invention, together with reference to the accompanying drawings.

DETAILED DESCRIPTION OF THE PREFERRED EMBODIMENTS

The present invention will be explained below in detail with reference to the embodiments shown in the accompanying drawings.

Figure 1:
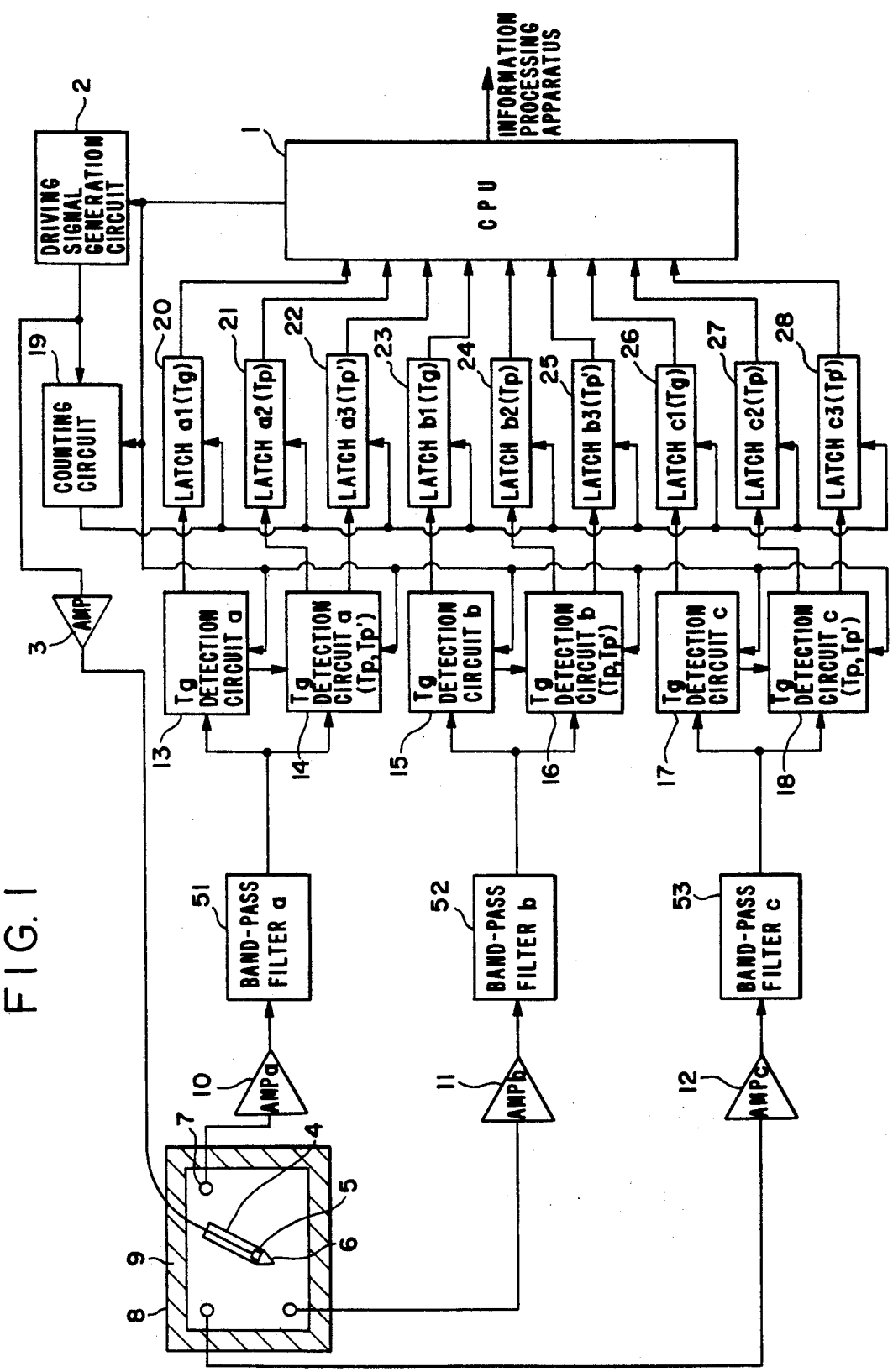
FIG. 1 is a block diagram showing the construction of a coordinate input apparatus of the present invention.

FIG. 1 is a block diagram showing the construction of a coordinate input apparatus of an embodiment of the present invention.

In FIG. 1, reference numeral 8 denotes a transmission plate forming a coordinate input tablet. The position of the coordinate is indicated by pressing a vibration pen 4 on the transmission plate 8. The vibration pen 4 is a pen that generates elastic waves within the transmission plate 8, through which elastic waves are transmitted, and comprises a vibrator 5, a horn 6 and a supporting body therefor.

Reference numeral 2 denotes a driving signal generation circuit for generating pen driving signals by an instruction from a CPU 1. Pen driving signals outputted from the driving signal generation circuit 2 are amplified by an AMP 3 and applied to the vibrator 5 of the vibration pen 4. Electrical driving signals are converted into mechanical ultra-sonic vibrations by the vibrator 5 and these vibrations are transmitted to the transmission plate 8 via the horn 6. Reference numeral 7 denotes a vibration sensor for detecting elastic waves transmitted through the transmission plate 8; and reference numeral 9 denotes a reflection preventing material for preventing reflections in an end surface of the transmission plate 8.

Vibration waves detected by the vibration sensor 7 are each amplified by amplifiers AMP a, b, and c (elements 10, 11 and 12) and output, via band-pass filters a, b and c (elements 51, 52 and 53), to Tg detection circuits a, b and c (elements 13, 15 and 17) and Tp detection circuits a, b and c (elements 14, 16 and 18). The functions of the bandpass filters a, b and c (elements 51, 52 and 53) will be described later.

Tg detection circuits a, b and c (elements 13, 15 and 17) detect a detection point of vibration based on a group velocity and output Tg detection signals.

On the other hand, Tp detection circuits a, b and c detect two points of vibration waves based on the phase velocity and output Tp detection signals and Tp' detection signals. There is a time difference of one wavelength between the above two detection points.

Regarding the count value of a counting circuit which starts counting in synchronism with the generation of a driving signal, latches a1 to a3, b1 to b3, and c1 to c3 (elements 20 to 28) read in transmission time Tg based on the group velocity and transmission time Tp based on a phase velocity, with the Tg and Tp detection signals as triggers.

The CPU 1 computes the distance r from a point indicated by the vibration pen 4 to the vibration sensor 7 on the basis of the Tg and Tp and thereafter obtains the coordinate values of the indicated point by performing a geometric calculation. The computation of the distance r and the coordinate values will be described later.

Figure 2:
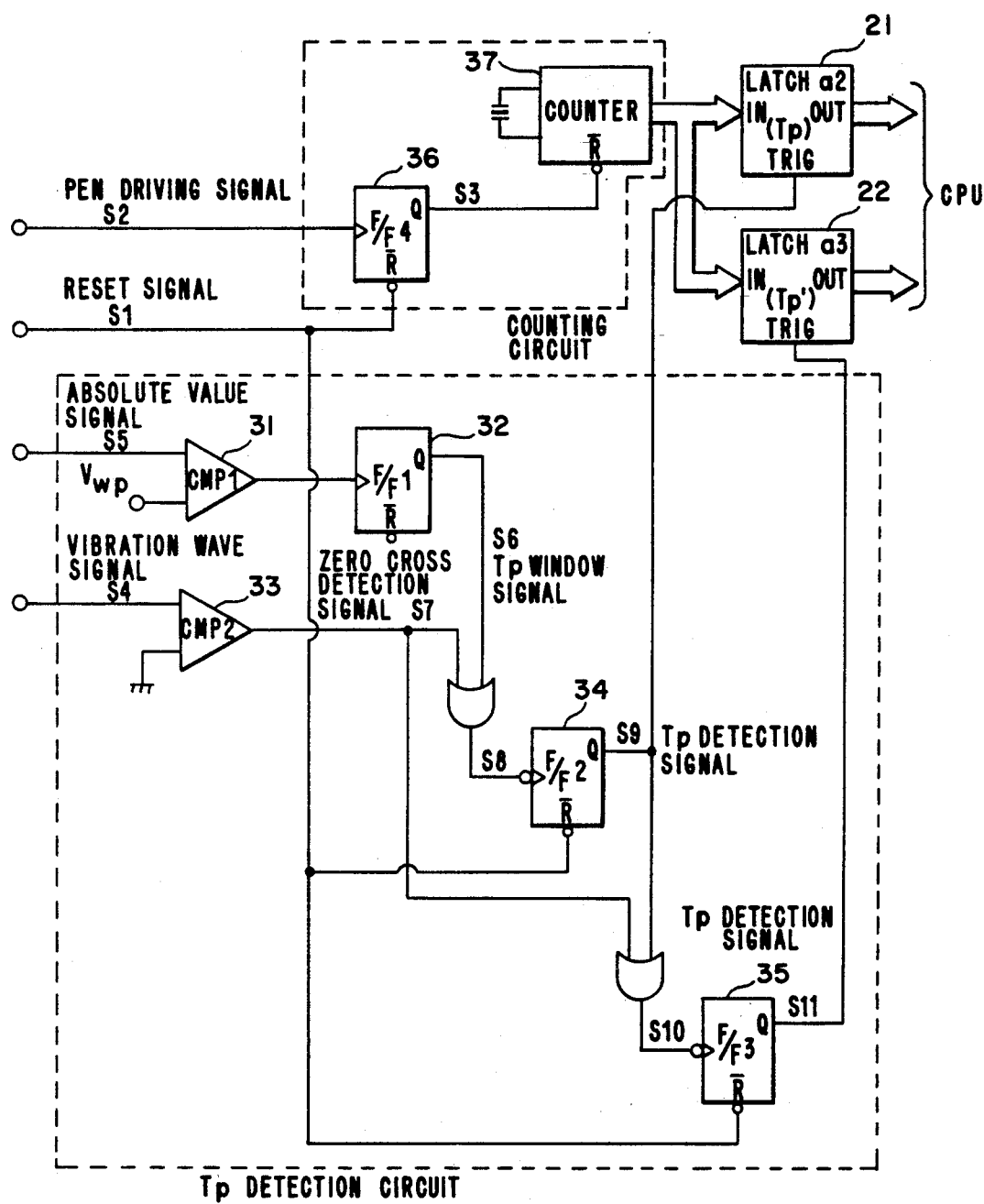
FIG. 2 is a block diagram showing the arrangement of a Tp detection circuit.
Figure 3:
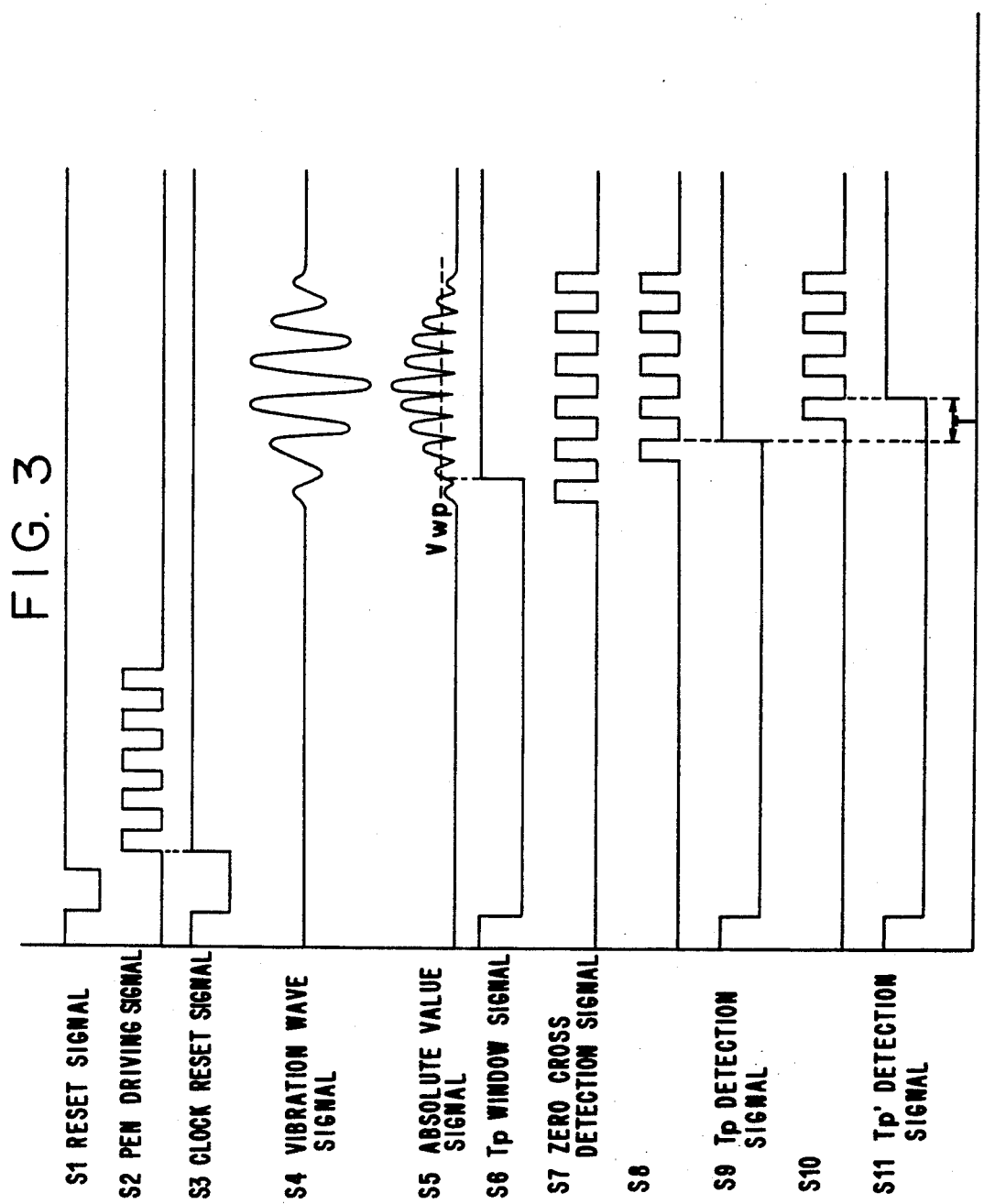
FIG. 3 is a waveform chart showing signal waveforms of each section of FIG. 2.

FIG. 2 is a block diagram showing the arrangement of a Tp detection circuit in FIG. 1. FIG. 3 is a waveform chart showing signal waveforms of each section of FIG. 2. In these figures, reference numeral 33 denotes a comparator for detecting a zero cross point of a signal S4 of vibration wave signals detected by the vibration sensor 7; reference numeral 31 denotes a comparator for generating a Tp window signal S6 for instructing the start of the detection, of the transmission time Tp detected as the above-described zero cross point.

Reference numeral 32 denotes a flip-flop circuit for the Tp window signal S6 which rises with a signal outputted from a comparator CMP1 (element 31) as a trigger when an absolute value signal S5 obtained by converting a vibration wave signal supplied from the Tg detection circuit into an absolute value as described later exceeds a comparator level Vwp.

Reference numeral 34 denotes a flip-flop circuit for outputting a Tp detection signal S9 at a first trailing-edge zero-cross point after the Tp window signal, on the basis of a signal S8 which is a logical OR of the Tp window signal S6 and a zero cross detection signal S7.

Reference numeral 35 denotes a flip-flop circuit for outputting a Tp' detection signal S11 which is a trailing-edge zero-cross point after one wavelength from the Tp detection signal S9, on the basis of a signal S10 which is a logical OR of the Tp detection signal S9 and a zero-cross detection signal S7.

Reference numeral 36 denotes a flip-flop circuit for outputting a counter reset signal S3 in synchronism with the generation of a pen driving signal S2.

Reference numeral 37 denotes a counter which is set to a "0" value when a counter reset signal S3 reaches a low level and begins to count in synchronism with the rise of the signal 53. Latches a2 and a3 (elements 21 and 22) read transmission times Tp and Tp' based on the phase velocity with the Tp detection signal S9 and the Tp' detection signal S11 as triggers and output their values to the CPU.

Figure 4:
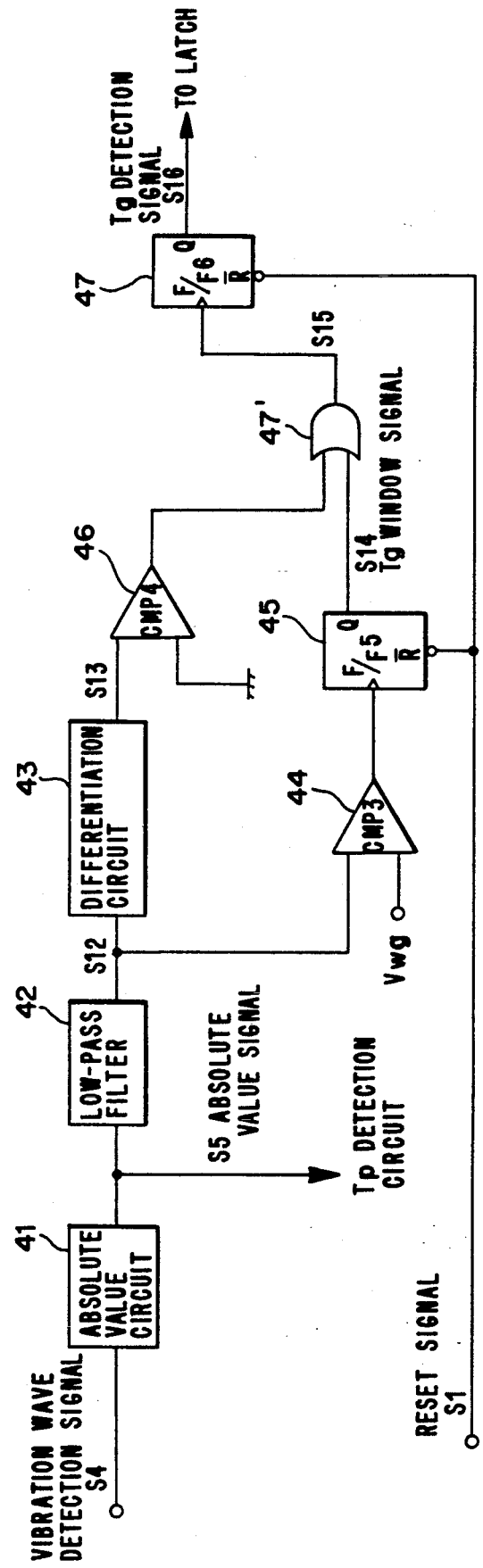
FIG. 4 is a block diagram showing the arrangement of a Tg detection circuit.
Figure 5:
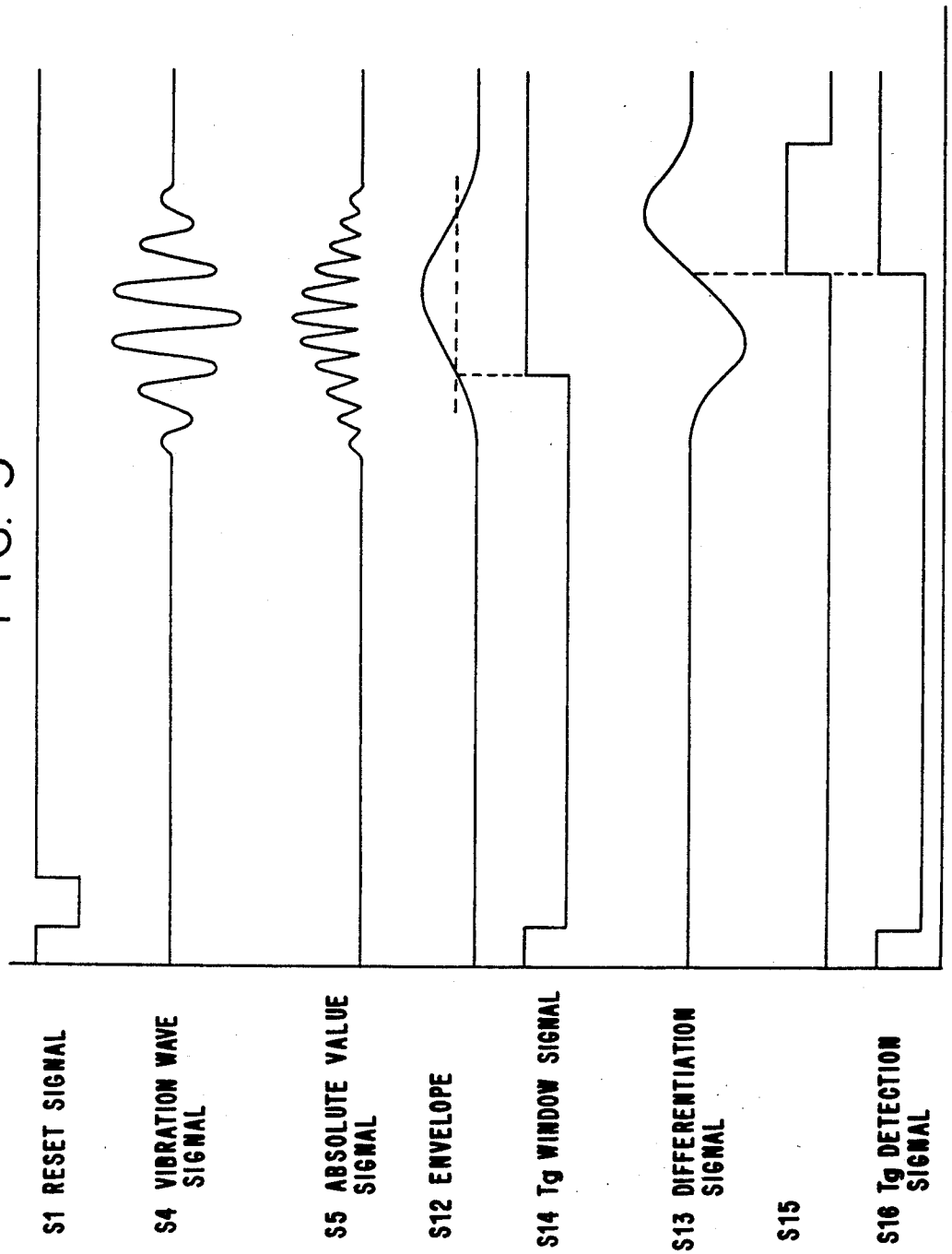
FIG. 5 is a waveform chart showing signal waveforms of each section of FIG. 4.

FIG. 4 is a block diagram showing the arrangement of a Tg detection circuit in FIG. 1. FIG. 5 is a waveform chart showing signal waveforms of each section of FIG. 4.

In these figures, reference numeral 41 denotes an absolute value circuit for converting the vibration wave signal S4 into an absolute value; and reference numeral 42 denotes a low-pass filter for extracting an envelope S12 of the absolute value signal S5.

Reference numeral 43 denotes a differentiation circuit for differentiating the envelope S12 and outputting a differentiation signal S13; reference numeral 46 denotes a comparator for detecting the zero cross point of the differentiation signal S13 corresponding to the peak of the envelope S12; reference numeral 44 denotes a comparator for detecting when the envelope S12 exceeds a comparison level Vwg; and reference numeral 45 denotes a flip-flop for outputting the Tg window signal S14 which rises in synchronism with the above detection.

Next, the logical OR of an output signal of a comparator CMP4 (46) and the Tg window signal S14 is performed to obtain a signal S15 from OR circuit 47' in which an extraction is performed at the zero cross point of the differentiation signal S13 corresponding to the peak of the envelope S12.

Reference numeral 47 denotes a flip-flop for outputting a Tg detection signal S16 in synchronism with the detection of the above zero cross point in response to the signal S15. Latch a1 (element 20 in FIG. 1) reads transmission time Tg based on the group velocity from the counter with Tg detection signals as a trigger and outputs the value to the CPU.

Processes of computation to be performed by the CPU 1 will now be explained.

Figure 6:
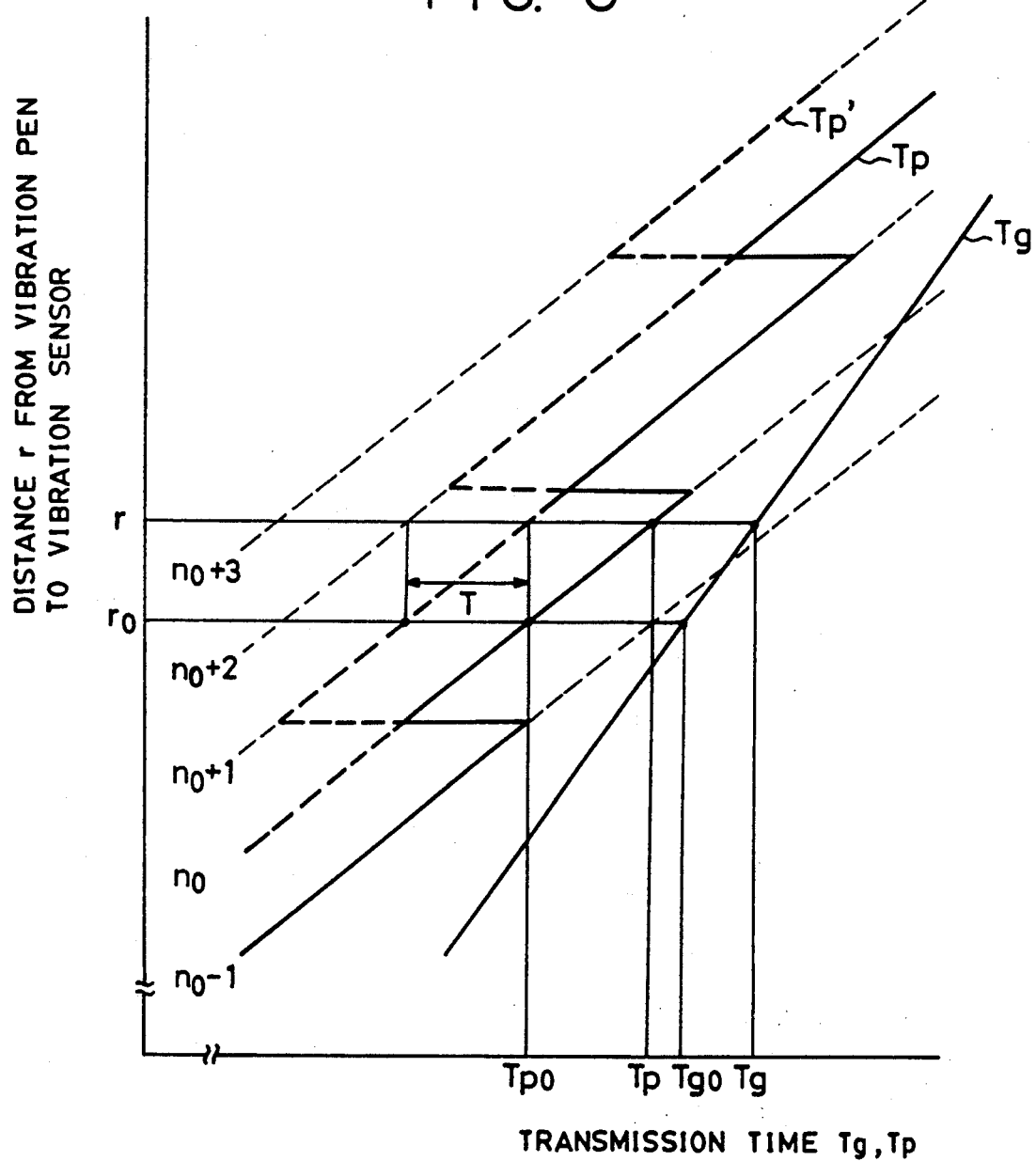
FIG. 6 is a diagram illustrating the relationship between transmission times Tg and Tp and a distance r from a vibration pen to a vibration sensor.

FIG. 6 shows the relationship between transmission times Tg and Tp and a distance r from a vibration pen to a vibration sensor. In FIG. 6, if transmission time based on the group velocity at a known reference point r0 is denoted as Tg0 and transmission time based on the phase velocity as Tp0, the relational equation described below is obtained:

$$r0 = Vg\,(Tg0 - \Delta Tg) \qquad (1)$$

$$r0 = n0\lambda + Vp\,(Tp0 - \Delta Tp) \qquad (2)$$

where

Vg: group velocity
dTg: detected delay time in the Tg detection system
Vp: phase velocity
λ: wavelength (λ = Vp/f)
f: frequency
n0 number of wavelengths from the beginning of the group at the Tg detection point.

If transmission times at a given point r are each denoted as Tg and Tp, the relational equations described below can be obtained:

$$r = Vg\,(Tg - \Delta Tg) \qquad (3)$$

$$r = n\lambda + Vp\,(Tp - \Delta Tp) \qquad (4)$$

Here, the relational equations described below can be obtained from equation (3)−equation (1):

$$r = r0 + Vg\,(Tg - \Delta Tg0) \quad (5)$$

In equation (5), Vg is a constant unique to a material used for a transmission plate, and r0 and Tg0 are known values. Therefore, if Tg is measured, r can be computed. However, to measure Tg, a single fixed point on the waveform of the envelope must be detected, and therefore, measurement with a high degree of accuracy is difficult.

The relational equations described below can be obtained from equation (2)−(1) and equation (4)−(3):

$$n0 = \{Vg\,(Tg0 - \Delta Tg) - Vp\,(Tp0 - \Delta Tp)\}/\lambda \quad (6)$$

$$n = \{Vg\,(Tg - \Delta Tg) - Vp\,(Tp - \Delta Tp)\}/\lambda \quad (7)$$

In addition, the relational equations described below can be obtained from equation (7)−(6):

$$n - n0 = \{Vg\,(Tg - Tg0) - Vp\,(Tp - Tp0)\}/\lambda \quad (8)$$

Furthermore, the relational equations described below can be obtained from equation (4)−(2):

$$r0 = r0 + (n - n0)\lambda + Vp\,(Tp - Tp0) \quad (9)$$

In equations (8) and (9), Vg and Vp are constants unique to a material used for a transmission plate. The relation $r = Vp/f$ holds. $f = 1/T$ (f: frequency, T: cycle) can be measured. Therefore, if Tg and Tp are measured, the distance r can be detected from equations (8) and (9). In this case, even if Tg contains errors, $n - n0$ can be determined from the following:

$$n - n0 = int\,[\{Vg(Tg - Tg0) - Vp\,(Tp - Tp0)\}/\lambda + 0.5] \quad (10)$$

Furthermore, by substituting the value of $n - n0$ determined by equation (10) for equation (9), the distance r can be computed. Since, in equation (9), r is computed on the basis of Tp in which measurement with a high degree of accuracy is possible, a distance value r having a higher accuracy can be determined for the case of equation (5).

Figure 8:
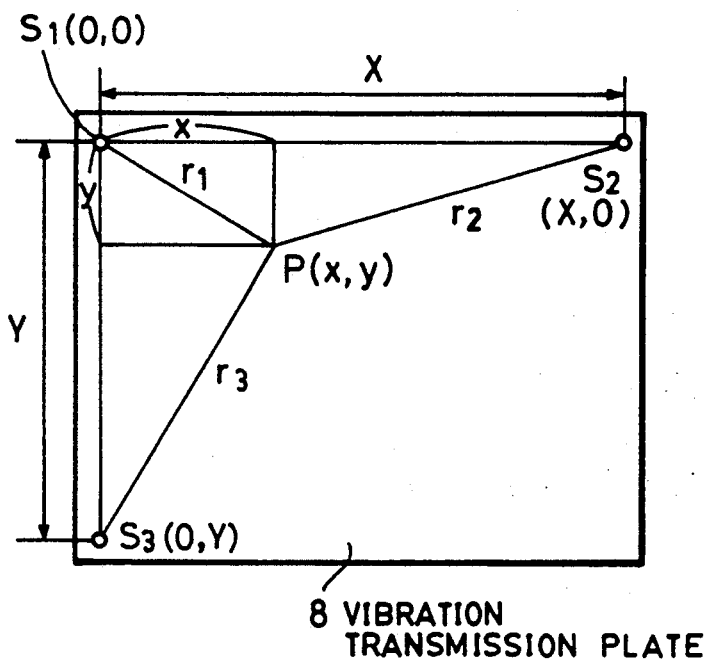
FIG. 8 is a diagram showing the placement of the vibration sensor in the coordinate input apparatus.

Now, a method of obtaining coordinate information from distance information obtained by detecting vibrations will be shown. As shown in FIG. 8, when three vibration sensors 7 are placed at positions of S1 to S3 in each section of the transmission plate 8, straight-line distances r1 to r3 from the position P to the position of each vibration sensor 7 can be determined. In addition, the coordinates (x, y) of the position P of the vibration pen 4 can be determined by the CPU 1 on the basis of these straight-line distances r1 to r3 from the Pythagorean theorem as shown in the following equations:

$$x = X/2 + (r1 + r2)(r1 - r2)/2X \quad (11)$$

$$y = Y/2 + (r1 + r3)(r1 - r3)/2Y \quad (12)$$

where x and y indicate distances along the X and Y axes, respectively, between the vibration sensors 7 at positions S1 and S3 and the sensor at the origin (position S1).

A characteristic construction of the present invention will now be explained.

Figure 9:
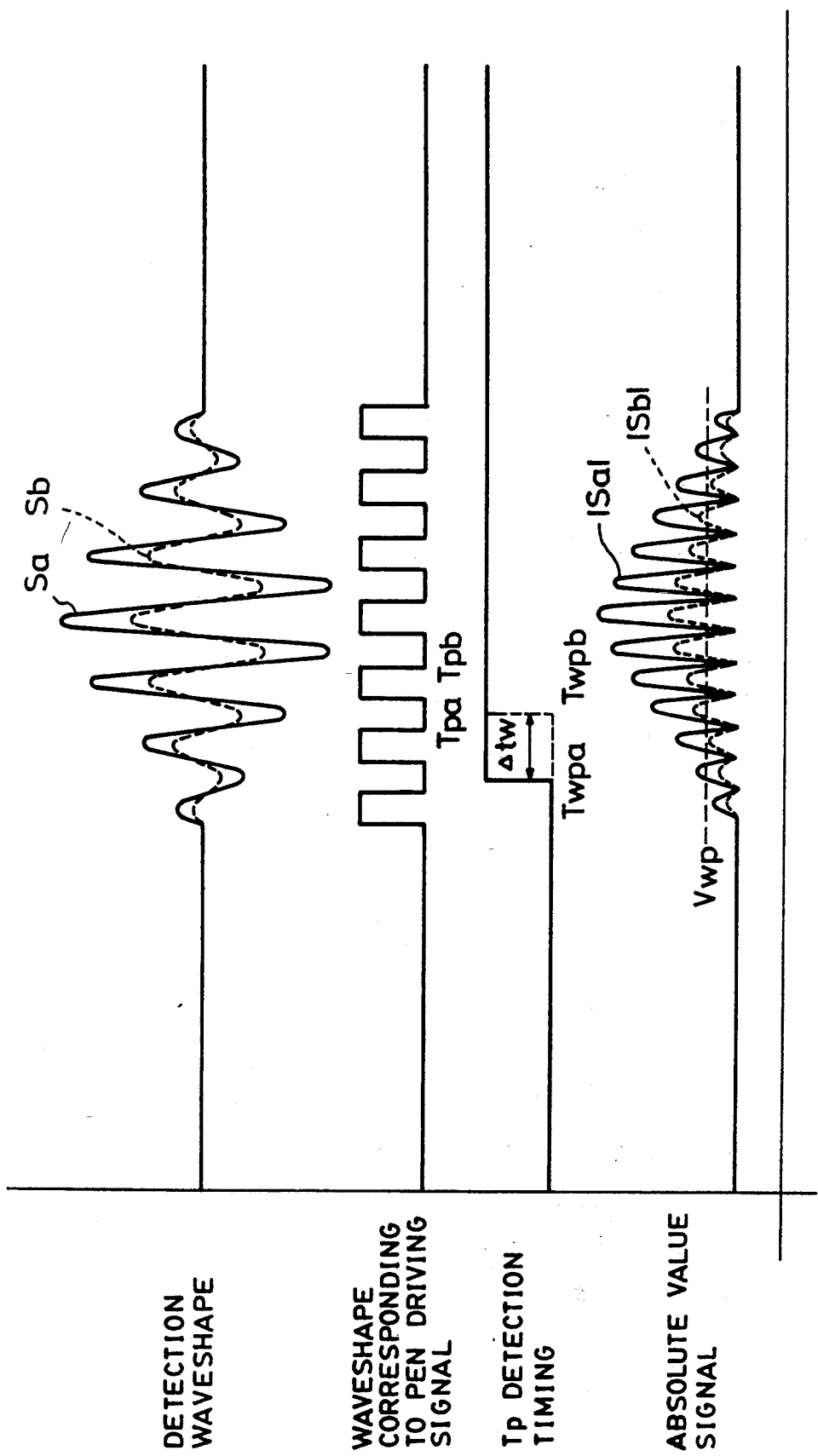
FIG. 9 is a diagram illustrating the variations in the level of vibration wave signals and the movement of a Tp detection point.

FIG. 9 is a view showing the variations in the level of vibration wave signals and the movement of the Tp detection point. Tp window signals which rise when absolute value signals $|Sa|$ and $|Sb|$, obtained by converting vibration wave signals Sa and Sb into absolute values exceeds a comparison level Vwp for Tp window signals, become Twpa and Twpb having a time difference of $\Delta tw$. The Tp window signals become Tpa and Tbp having a time difference of one wavelength due to the difference in these Tp window signals.

Figure 10:
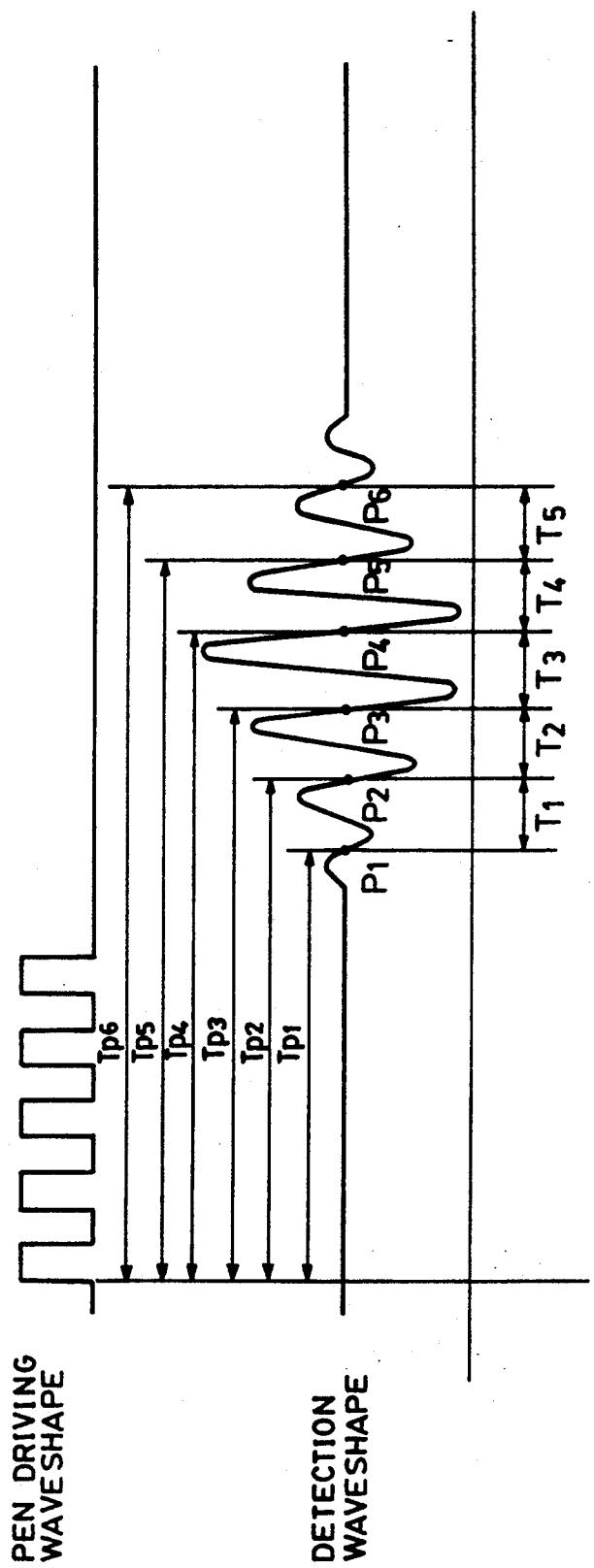
FIG. 10 is a diagram illustrating the relationship between the Tp detection point and the transmission time Tp.

FIG. 10 shows the relationship of the transmission time Tp at a Tp detection point.

As is apparent from FIG. 10, as the Tp detection point moves as P1→P2→P3→P4→P5→P6, the transmission time changes as Tp1→Tp2→Tp3→Tp4→Tp5→Tp6. At the time of actual pen input, the level of vibration wave signals changes according to the changes in the input state and the Tp detection point moves.

Figure 11:
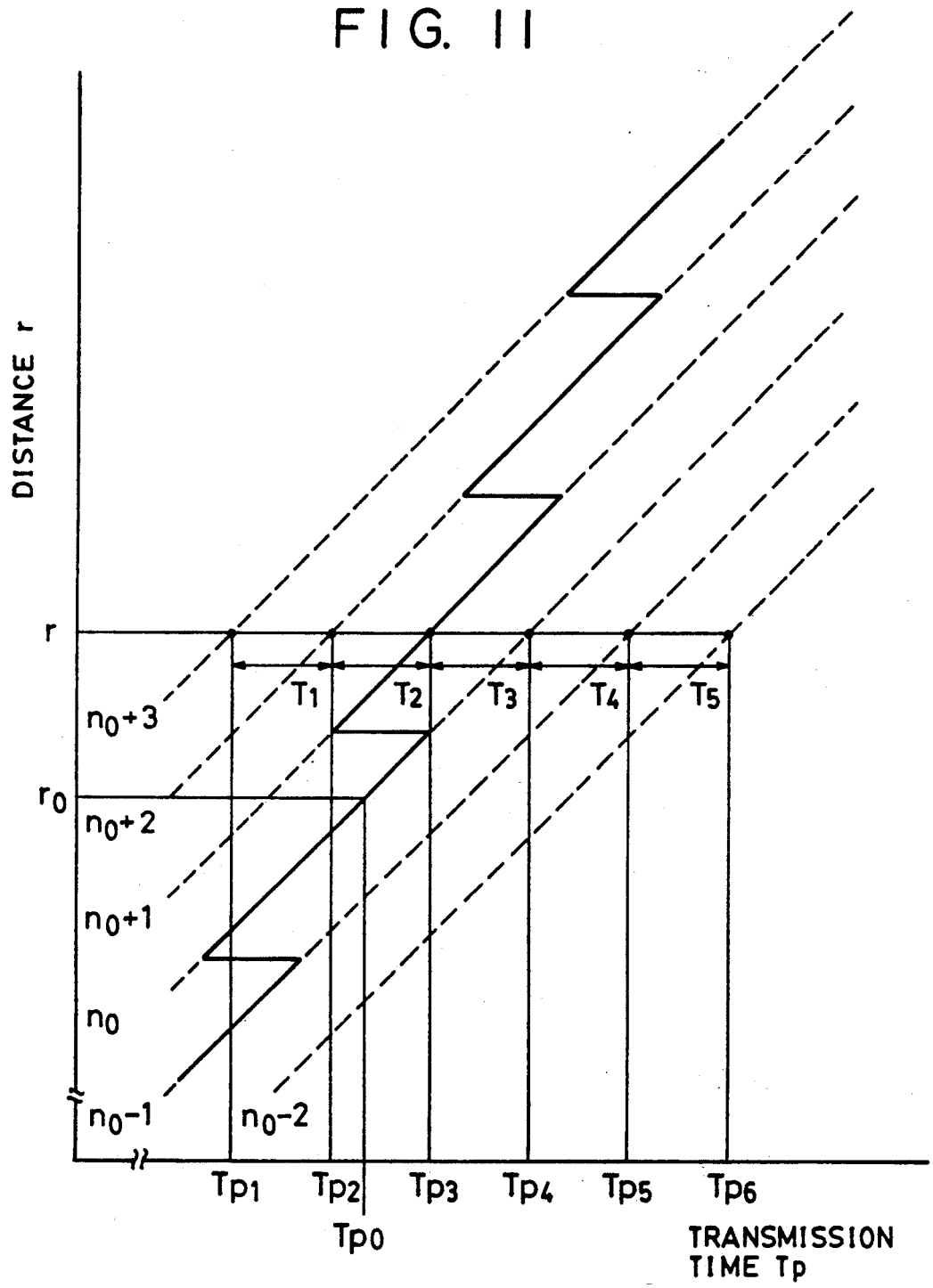
FIG. 11 is a diagram showing the relationship between the transmission time Tp and a detection detector r.

FIG. 11 shows the relationship between the transmission time Tp and the detected distance r In FIG. 11, if transmission time at a known input point r0 is denoted as Tp0, the distances r determined when transmission time is Tp6 become the following from equation (9):

$$\begin{aligned} r1 &= r0 + \{(n0 + 3) - n0\}\lambda + Vp(Tp1 - Tp0) \\ &= r0 + 3\lambda + Vp(Tp1 - Tp0) \end{aligned} \quad (13)$$

$$\begin{aligned} r2 &= r0 + \{(n0 + 2) - n0\}\lambda + Vp(Tp2 - Tp0) \\ &= r0 + 2\lambda + Vp\{(Tp1 + T1) - Tp0\} \\ &= r0 + 2\lambda + VpT1 + Vp(Tp1 - Tp0) \end{aligned} \quad (14)$$

$$\begin{aligned} r3 &= r0 + \{(n0 + 1) - n0\}\lambda + Vp(Tp3 - Tp0) \\ &= r0 + \lambda + Vp\{(Tp1 + T1 + T2) - Tp0\} \\ &= r0 + \lambda + Vp(T1 + T2) + Vp(Tp1 - Tp0) \end{aligned} \quad (15)$$

$$\begin{aligned} r4 &= r0 + \{(n0 - n0)\}\lambda + Vp(Tp4 - Tp0) \\ &= r0 + Vp\{(Tp1 + T1 + T2 + T3) - Tp0\} \\ &= r0 + \lambda + Vp(T1 + T2 + T3) + Vp(Tp1 - Tp0) \end{aligned} \quad (16)$$

$$\begin{aligned} r5 &= r0 + \{(n - 1) - n0\}\lambda + Vp(Tp5 - Tp0) \\ &= r0 - \lambda + Vp\{(Tp1 + T1 + T2 + T3 + T4) - Tp0\} \\ &= r0 + \lambda + Vp(T1 + T2 + T3) + Vp(Tp1 - Tp0) \end{aligned} \quad (17)$$

$$\begin{aligned} r6 &= r0 + \{(n - 2) - n0\}\lambda + Vp\{(Tp2 - Tp0)\} \\ &= r0 - 2\lambda + Vp\{(Tp1 + T1 + T2 + T3 + T4 + T5) - Tp0\} \\ &= r0 - 2\lambda + Vp(T1 + T2 + T3 + T4 + T5) + Vp(Tp1 - Tp0) \end{aligned} \quad (18)$$

In equations (13) to (18), the wavelength λ is a product of the phase speed Vg and the cycle T. Therefore, if T1=T2= T3=T4=T5=T, r1=r2=r3=r4=r5=r. Actually, however, the relation T1=T2=T3=T4=T5=T does not hold.

That is, the response in the pen tip with respect to the driving frequency at which piezoelectric elements are driven does not become a single frequency spectrum, but contains various frequency components. Therefore, when vibrations transmitted on the transmission plate are output by the sensor, detected signal waveforms are output as a composite wave of waves of various frequencies. The cycle of the phase of the composite wave is not fixed. When the cycle at zero cross is measured, the value differs depending upon what portion of the detected signal waveforms was measured.

Therefore, in this embodiment, means are disposed for extracting only specific frequency components from detected waves of composite waves containing these various frequency components. To be specific, specific frequency components are extracted by filtering detected signals by using the band-pass filters a, b and c (elements 51, 52 and 53) of FIG. 1.

In the present invention, signal detection is performed via band-pass filters a, b and c (elements 51, 52 and 53) whose central frequency is a frequency of pen driving signals and whose bandwidth (3db) is twice the frequency of the envelope.

Figure 12:
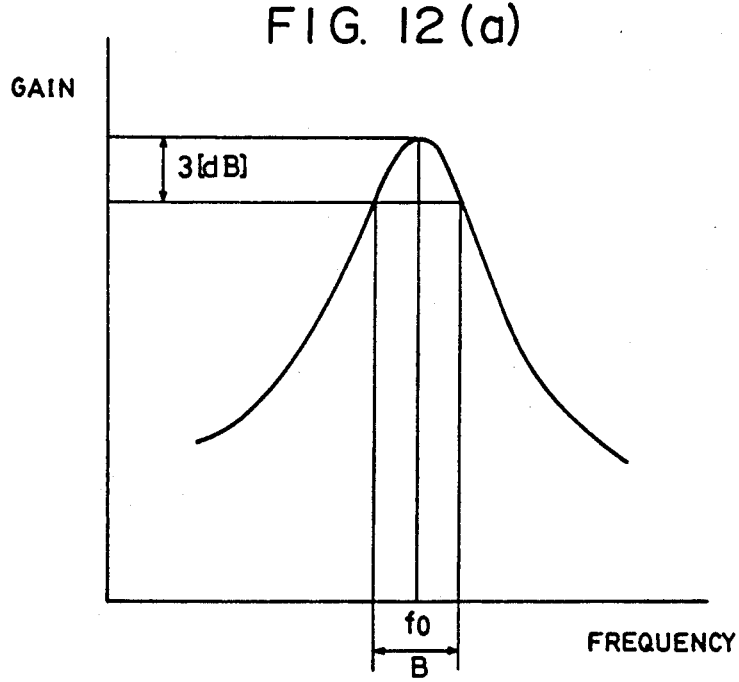
FIGS. 12(a) and 12(c) are diagrams showing characteristics of a band-pass filter.
Figure 12:
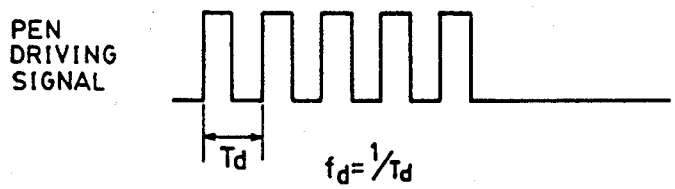
Figure 12:
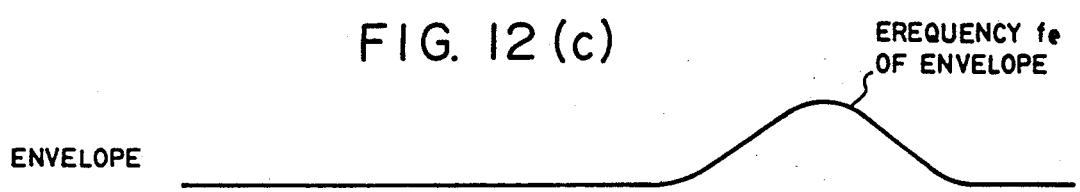
Figure 13:
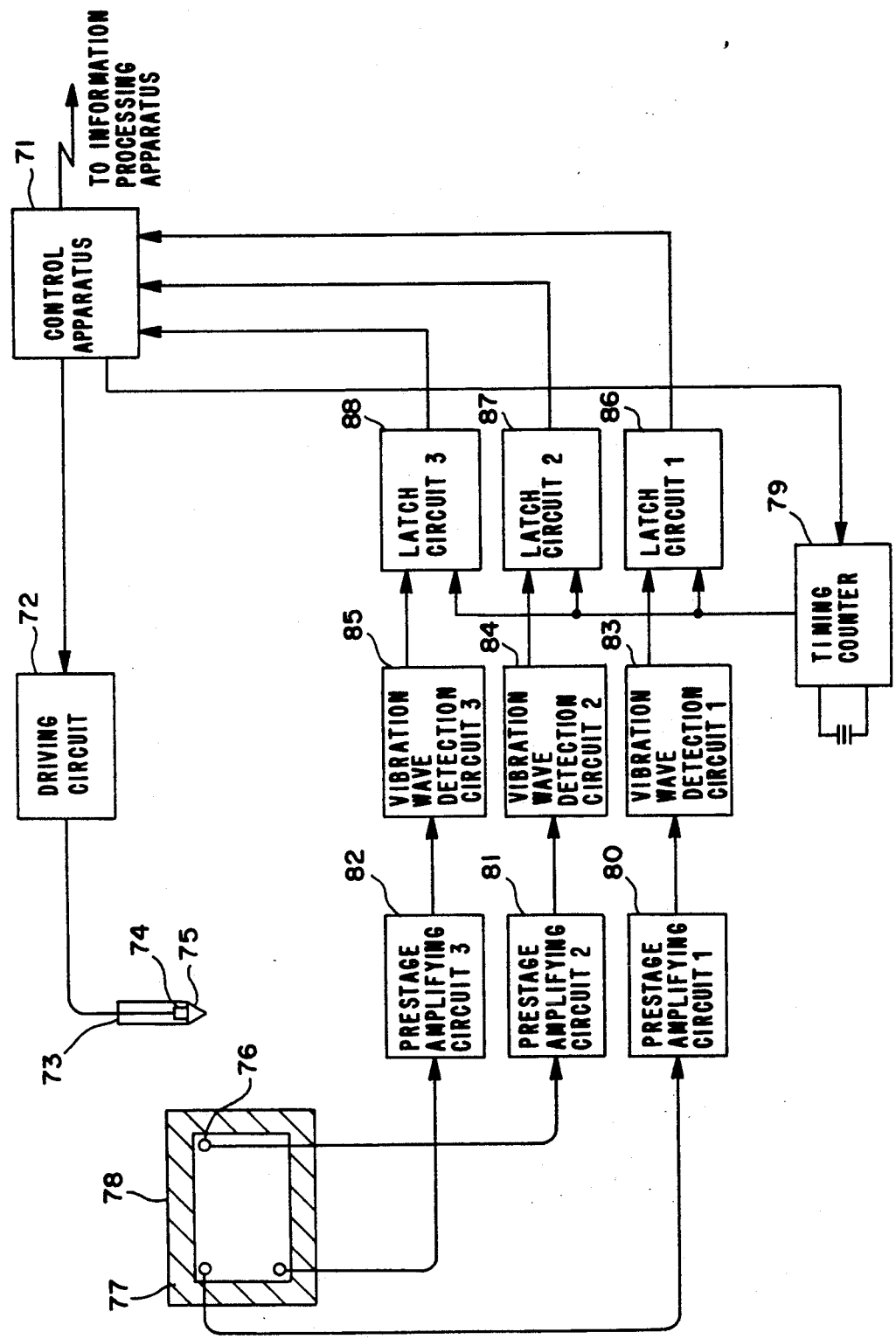
FIG. 13 is a block diagram of a conventional coordinate input apparatus.

FIGS. 12(a) to 12(c) show the characteristics of bandpass filters a, b and c (elements 51, 52 and 53). As shown, if the frequency of pen driving signals is made to be fd = 1/Td (FIG. 12(b)), the central frequency f0 of the bandpass filter becomes the following:

$$f0 = fd = 1/Td \quad (19)$$

If the peak value frequency of the power spectrum of the envelope is made to be fe (FIG. 12(c)), the bandwidth B (FIG. 12(a)) becomes the following:

$$B = 2fe \quad (20)$$

As the result of the addition of band-pass filters described above, T1 to T5 shown in FIGS. 10 and 11 are averaged as described below:

$$T1 = T2 = T3 = T4 = T5 \quad (21)$$

Straight lines (n0−2) to (n0+3) of FIG. 11 become equally spaced parallel lines. Also, even if the relation shown in equation (21) holds, if there is a difference between $\lambda = VpT$ used for the calculation and actual $\lambda R = VpRTR$, a detection error described below occurs:

$$\Delta r = (n - n0)(\lambda - \lambda R) + (Vp - VpR)(Tp - Tp0) \quad (22)$$

Therefore, to increase the detection accuracy of the distance r, an accurate cycle T and the phase speed Vp must be determined and used for the calculation.

The above-described Tp detection circuit can detect transmission times Tp and Tp' having a time difference of one wavelength. Also, as described above, as the result of the addition of the band-pass filters a, b and c (elements 51, 52 and 53), because the relation of equation (21) holds, it is sufficient that the cycle T at one place shown in FIG. 6 be measured. The frequency f used for calculating the distance can be determined by using the cycle T.

Now, a problem in mass production will be considered. In the case of mass production, variations or changes in characteristics described below exert an influence on constants (Vp and Vg):

(1) variations in resonance characteristics of piezoelectric elements which are vibration generation sources;

(2) variations in mechanical characteristics resulting from variations, such as mechanical machining accuracy between individual pens;

(3) variations in driving frequency among circuits;

(4) variations in the characteristics of a filter which extracts a single frequency; and Furthermore, depending upon changes due to aging during use, (5) changes in the mechanical characteristics due to the difference in the amount of the wear of a pen tip (horn)

Figure 14:
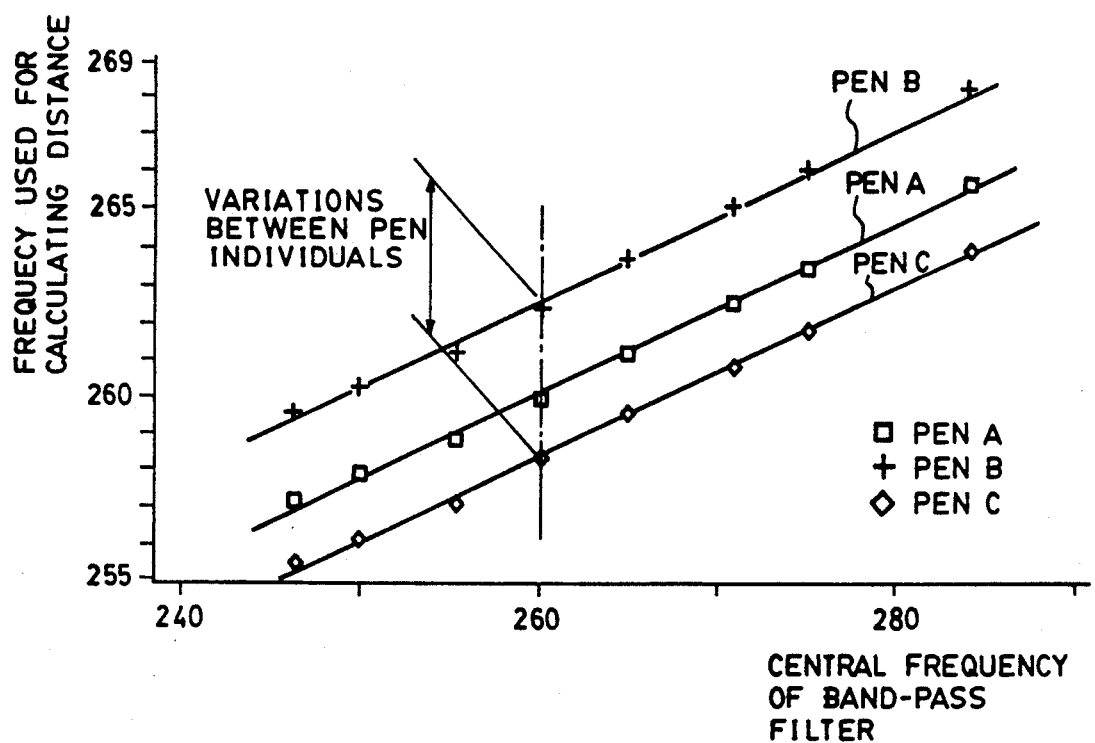
FIG. 14 is a diagram illustrating variations between individual vibration pens.

FIG. 14 shows variations between individual vibration pens. The horizontal axis indicates a central frequency of the band-pass filter, and the vertical axis indicates a frequency calculated from the above-described construction.

When a driving frequency of an input pen is made to be 260 kHz, results obtained for three input pens are shown.

An example in which the central frequency of the bandpass filter is 260 kHz will be explained. The three input pens cause a difference of approximately 5 KHz in a bandpass filter having the same central frequency. This difference corresponds to the above-described problem (variations and changes in the characteristics (1) and (2)) which exert an influence on constants at the time of mass production. Unless the constants are corrected by some means, the accuracy will decrease.

As regards the above-described problem (3), the same results are obtained. After all, to realize a highly accurate coordinate input apparatus, variations in the driving frequency must be suppressed as much as possible, or constants must be corrected.

On the other hand, in this embodiment, the central frequency of a band-pass filter, which is a means for providing a single frequency component, varies in mass production.

Referring to FIG. 14, a case of a pen A will be explained. When the central frequency of the band-pass filter changes from 250 KHz to 271 KHz, a frequency constant required for calculating the distance changes from 258 KHz to 262 KHz.

As a consequence, unless the changes in the frequency due to the variations in the characteristics of the pen are corrected at the time of mass production, highly accurate coordinate input apparatuses cannot be constructed.

When apparatuses having no variations are mass produced with the above-described problems (1), (2), (3) and (4), not only does the yield decrease, but each of the parts is costly and the apparatuses cannot be made inexpensively.

Also, if, for example, a machining method with low accuracy is used to decrease the price of parts, variations increase. Each of the items must then be measured to correct the constants. Thus, after all, costs will rise.

According to the present invention, means for correcting these factors leading to these cost increases are provided. That is, constants f (=1/T), Vp, and $\lambda$ used for calculating the distance on the basis of the phase cycle T measured as described above can be calculated by the CPU. Therefore, coordinate input apparatuses with a high degree of accuracy can be realized at a low cost.

Figure 7:
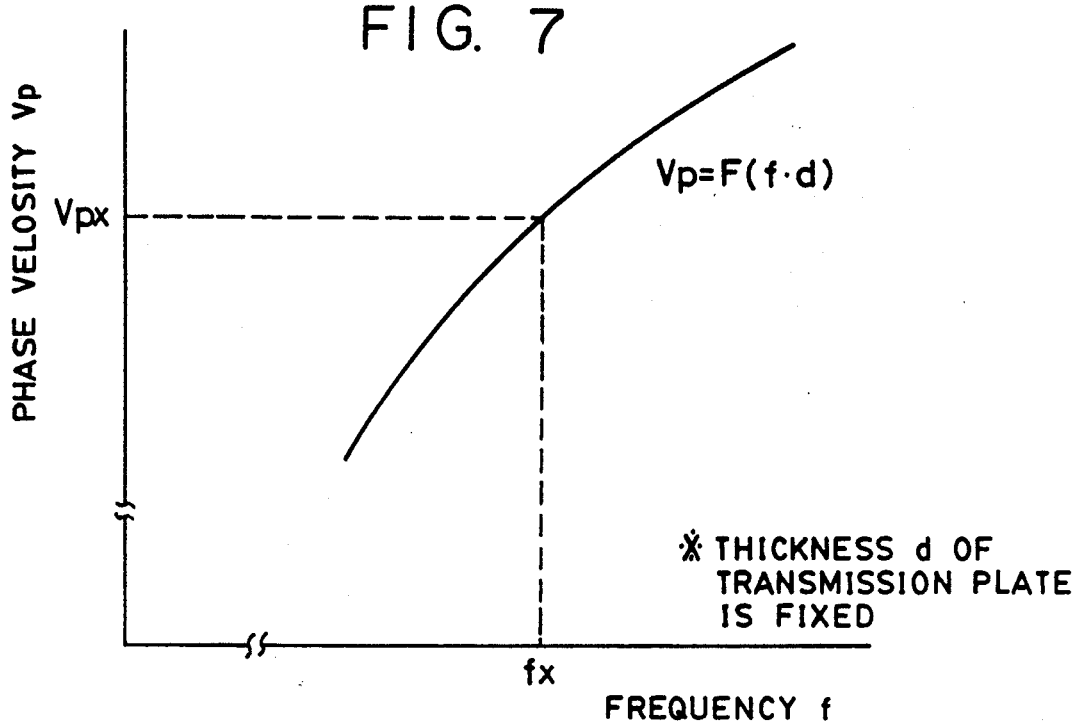
FIG. 7 is a diagram illustrating the relationship between frequency f and phase velocity Vp.

As regards a method of computing Vp, as shown in the relationship between the frequency f and the phase speed Vp of FIG. 7, the phase speed Vp of plate waves can be determined as a function of a product (Vp=F (f·d)) of the frequency f and the plate thickness d of the transmission plate.

Therefore, Vp in a transmission plate having a known plate thickness of d can be determined if the cycle T of equation (23) is measured. The detected accuracy of the distance r can be improved by using Vp and $\lambda = Vp/f = Vp \cdot T$ determined by the above-described method.

The coordinate values are computed by equations (11) and (12) which have been already described.

It does not matter if the computation of the abovedescribed constants is performed at the time the power supply is turned on, or if it is performed at any other time. Needless to say, it does not matter if it is performed intentionally by a user via an appropriate manual operation means.

Furthermore, highly accurate coordinate input apparatuses can be maintained at all times if the computation of constants is performed according to the present invention by the user inputting information, even if a horn member which is a pen tip is worn down and the mechanical characteristics thereof change.

Although, in this embodiment, as a means for extracting only specific frequency components, a band-pass filter using an electrical circuit is assumed, a band-pass filter using mechanical means may be used. For example, single frequency components may be extracted mechanically by using elements having a sharp resonance Characteristic as piezoelectric elements of the vibration sensor 7.

Although, in this embodiment also, vibration wave signals which have passed through the band-pass filters are also input to the Tg detection circuit, the Tg detection circuit needs not be via the band-pass filters.

According to the above-described embodiment, since components of vibrations of a specific frequency are extracted and constants f, Vp and Vg unique to the individual bodies of an apparatus are computed from the cycle of the waveform, variations, such as variations in the mechanical characteristics of an input pen, can be corrected at once. No inspection processes are required and therefore production costs can be reduced considerably.

Furthermore, since all constants used for calculating the distance can be computed by measuring the cycle of waveforms, stable and highly accurate inputting of coordinates is possible.

It is an advantage of the present invention that the accuracy of a coordinate input apparatus can be maintained over a long period of time since constants can be corrected at the proper time or automatically even if the constants change, for example, due to changes in the mechanical characteristics of an input pen. In addition, even when the input pen is replaced because of damage, a highly accurate inputting of coordinates can be made possible as it is, without performing adjustment operations.

Many different embodiments of the present invention can be made without departing from the spirit and scope thereof; therefore, it is to be understood that this invention is not limited to the specific embodiments described above and is solely defined in the appended claims.

What is claimed is:

1. A coordinate input apparatus, comprising:
    a vibration input pen for inputting vibrations;
    a vibration transmission member which the vibration input pen contacts at points and through which vibrations form the vibration pen are transmitted;
    a vibration sensor for detecting vibrations transmitted to the vibration transmission member;
    a circuit for extracting a signal representative of a cycle of vibrations detected by the vibration sensor;
    a measurement circuit for measuring the cycle of the signal extracted by the extracting circuit;
    a constant determination circuit for determining constants for calculating coordinates of the vibration input pen contact points on the basis of the cycle measured by the measurement circuit; and
    a control circuit for calculating the coordinates of the vibration input pen contact points on the vibration transmission member using the constants determined by the constant determination means.

2. A coordinate input apparatus according to claim 1, wherein is further disposed a filter circuit for permitting only predetermined frequency components to pass from the output of the vibration sensor, and wherein the output of the extractive filter circuit is used as the detected vibration for coordinate calculation.

3. A coordinate input apparatus according to claim 1, wherein the vibration sensor comprises piezoelectric elements for converting vibrations into electrical signals.

4. A coordinate input apparatus, comprising:
    a vibration input pen for inputting vibrations;
    a vibration transmission member which the vibration input pen contacts at points and through which vibrations from the vibration input pen are transmitted;
    vibration detection means for detecting vibrations transmitted through the vibration transmission member;
    a circuit for extracting a signal representative of a cycle of the vibrations detected by the vibration detection means;
    measurement means for measuring the cycle of the signal extracted by the extraction circuit;
    constant determination means for determining constants for calculating coordinates of the vibration input pen contact points on the basis of the cycle measured by the measurement means; and
    control means for calculating the coordinates of the vibration input pen contact points on the vibration transmission member using the constants determined by the constant determination means.

5. A coordinate input apparatus according to claim 4, wherein is further disposed a filter circuit for permitting only predetermined frequency components to pass from the output of the vibration detecting means, and wherein the output of the extractive filter circuit is used as the detected vibration for the coordinate calculation.

6. A coordinate input apparatus according to claim 4, wherein the vibration detecting means comprises piezoelectric elements which convert vibrations into electrical signal.

7. A coordinate input apparatus which detects the coordinate f a vibration input pen on a vibration transmission plate by detecting vibrations input form contact of the vibration input pen at points on the vibration transmission plate by means of a vibration sensor, comprising:
    a circuit for extracting a signal representative of cycle of the vibrations detected by the vibration sensor;
    a measurement circuit for measuring the cycle of the signal extracted by the extracting circuit;
    a constant determination circuit for determining constants for calculating coordinates of vibration input pen contact points on the basis of the cycle measured by the measurement circuit; and a control circuit for calculating the coordinates of the vibration input pen contact points on the vibration transmission plate using the constants determined by the constant determination means.

8. A coordinate input apparatus according to claim 7, wherein is further disposed a filter circuit for permitting only predetermined frequency components to pass form the output of the vibration sensor, and wherein the output of the extractive filter circuit is used as the detected vibrations for the coordinate calculation.

* * * * *

UNITED STATES PATENT AND TRADEMARK OFFICE
CERTIFICATE OF CORRECTION

PATENT NO. : 5,239,138
DATED : August 24, 1993
INVENTOR(S) : KATSUYUKI KOBAYASHI ET AL.    Page 1 of 4

It is certified that error appears in the above-identified patent and that said Letters Patent is hereby corrected as shown below:

ON THE TITLE PAGE:

AT [56] REFERENCES CITED

U.S. Patent Documents,
Insert, --4,777,329  10/1988  Mallicoat.....178/18--.
Foreign Patent Documents,
Insert --FOREIGN PATENT DOCUMENTS
         0368351  5/1990  European Patent Off.--.

AT [57] ABSTRACT

"Constants required for measurement are generated in a constant determination circuit on the basis of vibration cycle measurements and a circuit measures the cycle of the detected vibrations from the vibration sensor using the determined constants." should read
--A signal representative of the cycle of vibrations detected by the vibration sensor is extracted and constants required for measurement are generated in a constant determining circuit on the basis of the extracted vibration cycle signal. The coordinates of the input pen contact points on the vibration transmission plate are calculated using the determined constants.--.

SHEET 7 OF 13 IN THE DRAWINGS:

FIG. 7, "VELOSITY" should read --VELOCITY--.

UNITED STATES PATENT AND TRADEMARK OFFICE
CERTIFICATE OF CORRECTION

PATENT NO. : 5,239,138
DATED : August 24, 1993
INVENTOR(S) : KATSUYUKI KOBAYASHI ET AL.

It is certified that error appears in the above-identified patent and that said Letters Patent is hereby corrected as shown below:

COLUMN 1

Line 38, "$r=n\cdot\lambda+vp\cdot Tp$ (30)" should read --$r=n\cdot\lambda+Vp\cdot Tp$ (30)--.
Line 66, "(elements 80 to 83)." should read --(elements 80 to 82).--.

COLUMN 3

Line 5, "time tp" should read --time Tp--.

COLUMN 4

Line 36, "and" should read --to--.

COLUMN 5

Line 11, "bandpass" should read --band-pass--.

COLUMN 6

Line 54, "Vg;" should read --Vg:--.
Line 55, "dTg:" should read --$\Delta$Tg:--.
Line 59, "n0 number" should read --n0: number--.

UNITED STATES PATENT AND TRADEMARK OFFICE
CERTIFICATE OF CORRECTION

PATENT NO. : 5,239,138
DATED : August 24, 1993
INVENTOR(S) : KATSUYUKI KOBAYASHI ET AL.   Page 3 of 4

It is certified that error appears in the above-identified patent and that said Letters Patent is hereby corrected as shown below:

COLUMN 7

Line 4, "$r=r0+Vg(Tg-\Delta Tg0)$  (5)" should read
--$r=r0+Vg(Tg-Tg0)$  (5)--.

Line 22, "$n-n0=\{Vg(Tg-Tg0)-Vp(Tp-Tp0))/\lambda$" should read
--$n-n0=\{Vg(Tg-Tg0)-Vp(Tp-Tp0)\}/\lambda$--.

Line 27, "$r0=r0$" should read --$r=r0$--.

Line 37, "$n-n0=int[\{Vg(Tg-Tg0)-Vp(Tp-Tp0)\}/\lambda+0.5]$  (10)" should read
--$n-n0=int[\{Vg(Tg-Tg0)-Vp(Tp-Tp0)\}/\lambda+0.5]$  (10)--.

Line 65, "positions 51 and 53" should read
--positions 52 and 53--.

COLUMN 8

Line 6, "exceeds" should read --exceed--.
Line 21, "r In" should read --r. In--.
Line 22, "point r0" should read --point r0--.
Line 39, "$\{(n0-n0)\}\lambda$" should read --$\{(n-n0)\}\lambda$--.

COLUMN 9

Line 34, "$T1=T2=T3=T4=T5$  (21)" should read
--$T1\approx T2\approx T3\approx T4\approx T5$  (21)--.

COLUMN 10

Line 2, "and Furthermore," should read
--and ¶ Furthermore,--.
Line 67, "T of" should read --T--.
Line 68, "equation (23)" should be deleted.

UNITED STATES PATENT AND TRADEMARK OFFICE
CERTIFICATE OF CORRECTION

PATENT NO.  : 5,239,138
DATED       : August 24, 1993
INVENTOR(S) : KATSUYUKI KOBAYASHI ET AL.    Page 4 of 4

It is certified that error appears in the above-identified patent and that said Letters Patent is hereby corrected as shown below:

COLUMN 11

Line 6,  "abovede-" should read --above-de- --.
    Line 24, "Characteristic" should read --characteristic--.
    Line 30, "needs" should read --need--.

COLUMN 12

Line 56, "signal." should read --signals.--.
    Line 58, "f" should read --of--.
    Line 59, "form" should read --from--.
    Line 63, "cycle" should read --a cycle--.

COLUMN 14

Line 2, "form" should read --from--.

Signed and Sealed this

Seventh Day of June, 1994

Attest:

BRUCE LEHMAN

Attesting Officer        Commissioner of Patents and Trademarks